No. 686,940. Patented Nov. 19, 1901.
C. HUSCHER.
BICYCLE LOCK.
(Application filed Mar. 1, 1901.)
(No Model.)
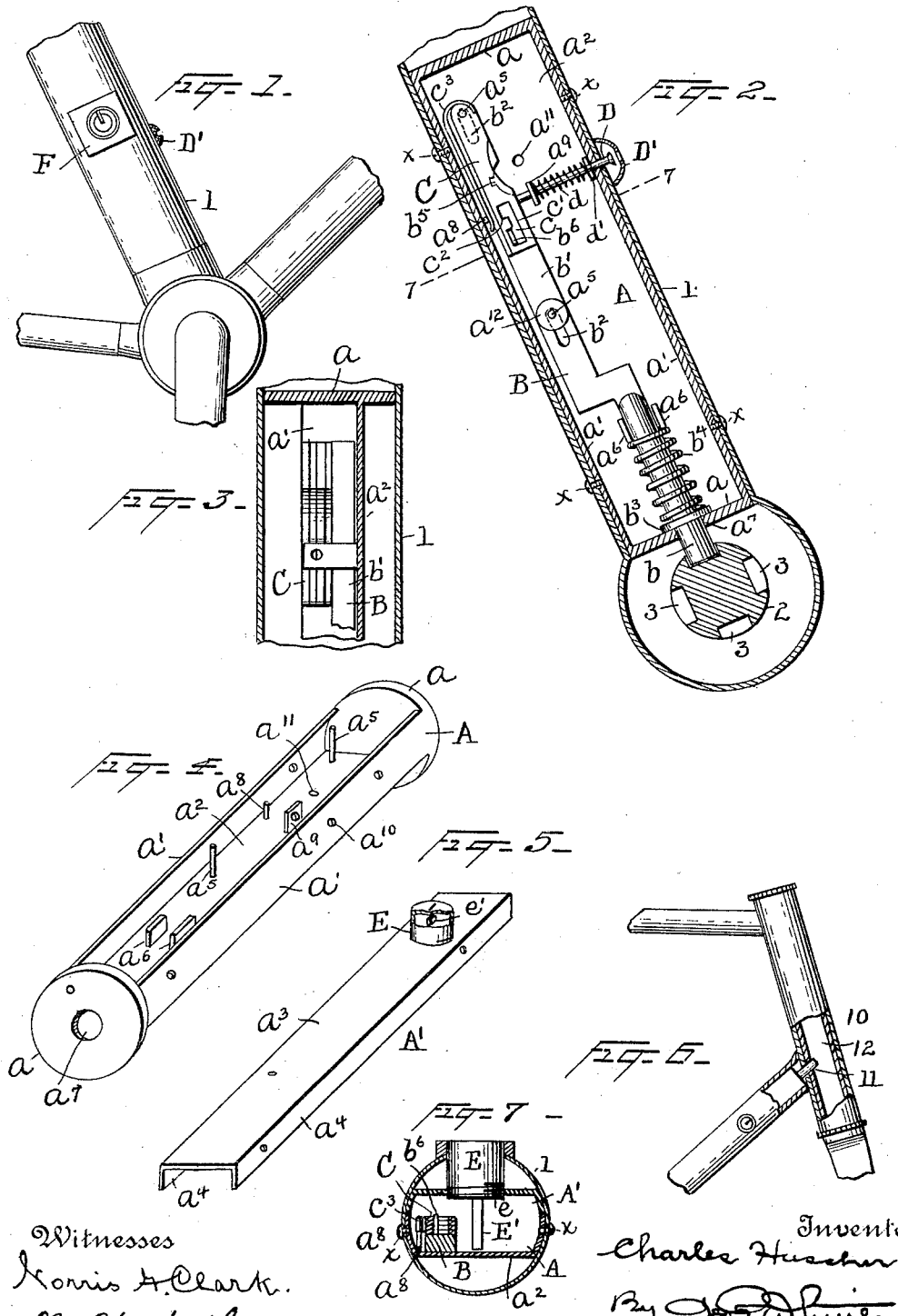
Witnesses
Norris H. Clark.
M. H. Watkins.
Inventor
Charles Huscher
By J. F. Whitney
Attorney
THE NORRIS PETERS CO., PHOTO-LITHO., WASHINGTON, D. C.

UNITED STATES PATENT OFFICE.

CHARLES HUSCHER, OF GOLDEN, COLORADO.

BICYCLE-LOCK.

SPECIFICATION forming part of Letters Patent No. 686,940, dated November 19, 1901.

Application filed March 1, 1901. Serial No. 49,472. (No model.)

*To all whom it may concern:*

Be it known that I, CHARLES HUSCHER, a citizen of the United States, residing at Golden, in the county of Jefferson and State of Colorado, have invented certain new and useful Improvements in Bicycle-Locks and the Like; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in bicycle-locks and the like, my object being to provide a lock structure carried by the bicycle-frame and forming a portion thereof, the locking parts being simply, conveniently, and compactly arranged and being concealed in and protected by one of the frame-tubes, the said lock being simple in operation and firmly locking the bicycle when operated.

To these ends and also to improve generally upon devices of the nature indicated, my invention consists in the various matters hereinafter described and claimed.

In the accompanying drawings, Figure 1 is a side elevation of a portion of a bicycle provided with the present lock. Fig. 2 is a sectional elevation thereof, the cover for the locking-casing being removed. Fig. 3 is a sectional elevation of a portion of the parts shown in Fig. 2 and taken at right angles to the plane of said former figure. Fig. 4 is a perspective view of the lock-casing, the cover being removed. Fig. 5 is a perspective view of the lock-casing cover, the key-barrel being shown partly in section; and Fig. 6 is a fragmentary view of a bicycle, showing the present lock applied to the steering-head. Fig. 7 is a cross-section on line 7 7, Fig. 2.

The present lock is designed to be carried in one of the frame-tubes of the bicycle and to engage some appropriate movable part of the machine to lock the same against movement. As illustrated in the first five figures of the drawings, the lock is carried in the seat-post tube 1 of the machine-frame and locks the crank-axle 2 against movement, said crank-axle having suitable peripheral recesses 3 to receive the locking-bolt. A casing A is provided for the locking parts, said casing having circular end pieces $a$, adapted to fit within the machine-tube which carries the lock, and to these end pieces or heads are attached side plates $a'$ and a back or base plate $a^2$. A removable cover A', having a front plate $a^3$ and side plates $a^4$, is provided for the said casing. The side plates $a'$ extend only a relatively short distance around the peripheries of the heads $a$, the side plates $a^4$ of the cover being of corresponding size, and as the back plate $a^2$ and front plate $a^3$ are merely flat plates connecting these side plates the lock-casing with the cover in place is a narrow box connected to the enlarged heads for positioning said box in the frame-tube. The upper face of the base-plate being in substantial alinement with the periphery of the opening in the casing-head, the locking-bolt can merely rest upon said base-plate and slide through said opening. The said casing can be secured to the tube in any suitable manner, and it is here shown as secured by screws $x$, passing through the machine-tube and also through the side plates of the casing, such construction permitting the present device to be readily applied to machines of common construction by any mechanic. If desired, the cover A' can extend over only a portion of the length of the body of the casing A.

Within the casing is the locking-bolt B, having the rounded bolt proper, $b$, at its lower end, while at the upper end of said bolt proper an offset is provided, the body portion $b'$ of said locking-bolt then extending as a flat bar. This offset construction permits the bolt proper to be centered within the casing, while the body portion is thrown to one side to make room for the hereinafter-mentioned key-barrel and to permit proper movement of the key. Elongated slots $b^2$ through the body portion $b'$ have posts $a^5$ extending through them, said posts being used to secure the body portion and top of the casing together and also serving as guides for the locking-bolt, while lugs $a^6$ upon the base-plate of the casing receive between them and guide the bolt proper, $b$, the free end of said bolt working through a central opening $a^7$ in the lower casing-head. A collar $b^3$ about the bolt at an appropriate point prevents said bolt from being unduly projected through the casing-head and also serves as a bearing for a spiral spring $b^4$, which encircles the bolt proper and engages said collar $b^3$ and the lugs $a^6$, said spring thus tending to force the bolt into locking position. The locking-bolt B slides upon the back plate of the casing, and at its upper portion in one of its side faces has a notch $b^5$, adapted to receive the key for operating the same. Suitable tumblers C are pivoted upon the upper post $a^5$, said tumblers being flat plates which lie on top of the locking-bolt over the key-notch $b^5$, and each tumbler is provided near its free end with a slot $c$, having a straight face $c'$ along the side corresponding to the face of the bolt provided with the key-notch, while from the ends of the opposite side of said slot small angular slots $c^2$ extend, these angular slots being adapted to receive a lug $b^6$, suitably formed upon the face of the bolt adjacent to the tumblers, said lug being slidable in the slot $c$. A spring $c^3$, suitably attached to the tumblers and bearing against a post $a^8$ upon the base-plate of the casing, tends to throw the free ends of the tumblers outwardly—i. e., in the position in which the bolt-lug rests in the angular slots. This post $a^8$ also connects with the cover A'. Preferably a washer $a^{12}$ about the lower post $a^5$ lies between the locking-bolt and the cover-plate, this washer being of a thickness corresponding to the combined thickness of the tumblers, and thus serving to steady the bolt in its movements.

Upon the base-plate of the casing, at the outer side of the locking-bolt and sufficiently removed from said bolt to permit free sliding movement of the latter, is a perforated lug $a^9$, through which operates a push-rod D, whose outer end extends through a perforation $a^{10}$ in the side plate of the casing A, said rod having its inner end adjacent the outer edges of the tumblers C and being normally forced outwardly and away from said tumblers by means of a spiral spring $d$, which encircles the said rod and has its inner end engaging said lug $a^9$, while its outer end engages a pin $d'$, extending through the push-rod. This pin $d'$ also engages the side plate of the cover, and thus prevents the rod being thrown too far outwardly. A guard D', slightly higher than the projecting rod-head, is attached to the frame-tube and surrounds said head, whereby the rod is guarded from accidental engagement.

After the above-mentioned parts have been assembled and secured in the frame-tube a key-barrel E is inserted through a suitable opening in the frame-tube and through a threaded opening in the front plate of the cover A', said barrel having exterior threads $e$ at its outer end, which engage the threads of the before-mentioned cover-plate opening. A key-guide E' is contained in said barrel and has its point resting in an opening $a^{11}$ in the base-plate of the casing A. At a suitable point of the barrel-wall is an inwardly-projecting lug $e'$, which serves to prevent the rotation of a key not having a slot corresponding to said lug. By varying the size and location of this lug and by suitably varying the outer faces of the tumblers C it is manifest that a great number of combinations can be produced, thus making it possible to provide each lock with a key of a distinct shape without altering the operative arrangement of the parts of the lock. An appropriate escutcheon F can be attached to the frame-tube about the outer end of the key-barrel.

When the parts are in unlocking position, the locking-bolt is raised and its lug $b^6$ rests in the upper angular slots in the tumblers, said bolt being thus securely held in the position indicated. To lock the wheel, the rod D is pushed inwardly by the operator, and thus the tumblers are rocked inwardly, carrying the upper angular slots away from the lug of the locking-bolt and bringing the slot $c$ in alinement with said lug. The bolt-operating spring $b^4$ then shoots the bolt into locking position to engage one of the recesses in the crank-shaft of the machine, and the push-rod D having meanwhile been released the tumbler-operating springs throw the free ends of the tumblers outwardly to bring the lower angular tumbler-recesses about the bolt-lug, thus securing the bolt in locking position, from which position the parts can be moved only by use of the key which pushes back the tumblers and engages and lifts the bolt, the said tumblers being released and engaging the bolt-lug in their upper angular notches after the bolt has been raised. The key is therefore not needed to effect the locking movement of the bolt, although it can be used for this purpose, if desired or necessary, as by reason of damage to the push-rod.

In Fig. 6 the lock is shown as contained in the lower forward frame-tube 10, the bolt entering a suitable hole 11 in the steering-head 12 of the machine. This notch is so placed that the steering-wheel is turned to permit the lock to engage the steering-head, and, manifestly, with the steering-wheel thus locked at an angle a bicycle cannot be conveniently rolled or ridden away by an unauthorized person.

The present lock is simple in its construction and applicable to any bicycle of usual construction. Its parts are compactly arranged and easily operated, and when the parts are thrown into operative position the bicycle is securely locked. The operating parts are concealed in and protected by the frame-tube, and the lock thus serves to strengthen said tube. The visible parts present a neat and attractive appearance.

Having thus described my invention, what I claim as new, and desire to secure by Letters Patent, is—

1. In a device of the nature indicated, a locking-bolt, means for normally forcing the same outwardly, a tumbler pivoted at one end and provided with a part engaging a suitable part upon said bolt to hold the said bolt in unlocking position, and a push-rod under the control of the operator and adapted to be thrust transversely against one edge of said tumbler to cause the same to swing and release the bolt.

2. In a device of the nature indicated, a casing having heads adapted to fit a receiving-tube and thus position said casing therein, one of said heads having an opening therethrough, a base-plate between said heads, guiding-lugs upon said base-plate, a perforated lug upon said base-plate, side plates upon said base-plate, a cover for said casing having a front plate and side plates thereon, a locking-bolt slidable along said base-plate between said guiding-lugs and at the side of said perforated lug, said bolt having elongated slots therethrough, posts extending through said slots and connecting said base and front plates, a tumbler for said bolt pivoted upon one of said posts and extending near said perforated lug, and a spring-retracted push-rod for operating said tumbler extending transversely through said perforated lug and through perforations in the side plates upon said base and front plates into proximity with the edge of the tumbler.

In testimony whereof I affix my signature in presence of two witnesses.

CHARLES HUSCHER.

Witnesses:
RAYMOND H. SORELL,
FRED L. BROWN.